United States Patent [19]

Andersson et al.

[11] Patent Number: 5,607,552
[45] Date of Patent: Mar. 4, 1997

[54] AQUEOUS SUSPENSIONS OF COLLOIDAL PARTICLES, PREPARATION AND USE OF THE SUSPENSIONS

[75] Inventors: Kjell Andersson, Göteborg; Hans Johansson, Kungälv; Erik Lindgren, Bohus; Marek Tokarz, Kungälv, all of Sweden

[73] Assignee: Eka Nobel, AB, Bohus, Sweden

[21] Appl. No.: 381,898

[22] PCT Filed: Aug. 11, 1993

[86] PCT No.: PCT/SE93/00664

§ 371 Date: Feb. 13, 1995

§ 102(e) Date: Feb. 13, 1995

[87] PCT Pub. No.: WO94/05595

PCT Pub. Date: Mar. 17, 1994

[30] Foreign Application Priority Data

Aug. 31, 1992 [SE] Sweden ................................ 9202501

[51] Int. Cl.$^6$ ........................ D21H 23/02; D21H 17/13; D21H 17/63
[52] U.S. Cl. ........................... 162/181.6; 162/181.8; 252/313.2; 252/315.5; 252/315.6
[58] Field of Search ................................ 252/313.2, 315.5, 252/315.6; 162/10, 181.6, 181.8; 210/705

[56] References Cited

U.S. PATENT DOCUMENTS

| 4,388,150 | 6/1983 | Sunden et al. | 162/175 |
| 4,872,993 | 10/1989 | Harrison | 210/666 |
| 5,030,286 | 7/1991 | Crawford et al. | 106/435 |

FOREIGN PATENT DOCUMENTS

| 0185068 | 6/1986 | European Pat. Off. | D21H 3/20 |
| 0218674 | 4/1987 | European Pat. Off. | D21H 3/38 |
| 0235893 | 9/1987 | European Pat. Off. | D21D 3/00 |
| 0310959 | 4/1989 | European Pat. Off. | D21D 3/00 |
| 9348366 | 12/1989 | European Pat. Off. | D21D 3/00 |
| 0359552B1 | 3/1990 | European Pat. Off. | D21H 17/68 |
| WO89/06637 | 7/1989 | WIPO | C01B 33/26 |
| WO91/07350 | 5/1991 | WIPO | C01B 33/146 |

Primary Examiner—Charles T. Jordan
Assistant Examiner—John R. Hardee
Attorney, Agent, or Firm—Ralph J. Mancini; Louis A. Morris

[57] ABSTRACT

Aqueous suspensions of colloidal particles which particles are both silica based anionic particles and swollen particles of clays of smectite type which are expandable in water and a process for the preparation thereof. The suspensions are useful as flocculating agents and particularly in combination with polymers in the production of paper.

18 Claims, No Drawings ns of colloidal
particles which particles are both silica based
anionic particles and hydrated particles of clays of smectite
type which expand in water. The invention also relates to a
process for the production of the suspensions and to the use
of these as flocculating agents in combination with ampho-
teric or cationic polymers, particularly in the production of
paper and pulp, but also for water purification.

During recent years systems based on anionic colloidal
particles and cationic or amphoteric synthetic or natural
polymers have gained an increased use, particularly at the
production of paper for increasing retention and dewatering.
The anionic colloidal particles have hereby been silica based
or have consisted of clay materials such as bentonite. Such
systems are for example disclosed in the European patents
41056, 218674 and 0235893. Generally a fairly high amount
of bentonite is required while the considerably more expen-
sive silica sols give good results at substantially lower
dosages. From the European patent 0310959 it is also known
to use both silica sol and bentonite together with cationic
starch. The silica sol and the bentonite can hereby be added
simultaneously or after each other and it is also indicated
that it is possible to mix the bentonite with the silica sol just
prior to addition to the stock.

Silica based particles are delivered in the form of aque-
ous sols of varying dry contents, mainly dependent on the
size of the sol particles. Sol particles are essentially spheri-
cal. Clay materials, such as for example bentonite, shall be
hydrated at use to give the desired effect, and in this form
they cannot be supplied as stable aqueous preparations of
sufficiently high dry content to be stored and transported.
Bentonite is thus handled in powder form and immediately
before use the powder is wetted to give the required swelling
and high shear forces are necessary to set surfaces free. In
contrast to silica particles clay particles have a flake-like
structure. Handling of powder materials is not desirable
since all handling of powder materials gives rise to dust
problems and dosage problems and since every user needs
equipment for wetting.

According to the present invention it has surprisingly
been found that it is possible to prepare stable aqueous
suspensions which contain both colloidal anionic silica
based particles and colloidal hydrated particles of expand-
able clays of smectite type. The term suspension as such
means a system in which small solid particles are essentially
uniformly dispersed in a liquid medium. In the present
suspensions the different types of colloidal particles, the
spherical silica particles and the flake-like clay particles, are
thus essentially uniformly dispersed in water. The suspen-
sions according to the invention can have comparatively
high dry contents, up to about 40 per cent, and the pre-
prepared suspensions can be delivered to the customer who
then avoids the above mentioned problems with handling of
powder materials. The suspensions have very good effect
both in combination with natural and synthetic polymers and
are very cost-efficient. Considerably higher effect can be
obtained with the suspensions than what could have been
expected by the amount of the particles of the respective
type in the suspensions. Particularly good effect is obtained
when the suspensions are used in combination with synthetic
polymers such as cationic polyacrylamide. With suspensions
according to the invention silica based particles having a
comparatively low specific surface area, i.e. comparatively
high particle size (about 50 to 400 $m^2/g$, corresponding to
about 50 to about 7 nm) can be used with good results. Silica
sols with these larger particle sizes have themselves not
given sufficiently good results to be commercially used
within the field of retention-dewatering.

The present invention thus relates to suspensions as
further defined in the claims.

Silica based particles, i.e. particles based on $SiO_2$, which
can be used in the present suspensions includes colloidal
silica and colloidal aluminium modified silica or aluminium
silicate and different types of polysilicic acid. Suitable silica
sols are such which are disclosed in the European patent
41056 and the European patent 185068. The colloidal silica
in these sols preferably have a specific surface area of
50–1000 $m^2/g$ and more preferably about 100–1000 $m^2/g$.
Commercially sols of this type with discrete particles having
a specific surface area of about 400–600 $m^2/g$ are usually
used and the average particle size is usually below 20 nm
and most often from about 10 down to about 1 nm. As stated
above, the greater particles of this type can also advanta-
geously be used, i.e. such having a specific surface area of
from about 50 to about 400 $m^2/g$. Particularly suitable silica
sols are such which have an S-value within the range of from
8 to 45 per cent and which contain silica particles having a
specific surface area within the range of from 750 to 1000
$m^2/g$ which are surface modified with aluminium to a degree
of from 2 to 25 per cent. This type of silica sol is described
in the PCT application WO 91/07350. The silica based
particles can also originate from sols based on polysilicic
acid and hereby it is meant that the silicic acid material is
present in the form of very small particles, of the order 1 nm,
with a very high specific surface area, above 1000 $m^2/g$ and
up to about 1700 $m^2/g$, and with a certain degree of
aggregate or microgel formation, as disclosed in the Euro-
pean patent application 348366, the European patent appli-
cation 359552 and the PCT application WO 89/06637.
Further, the silica based particles can originate from silica
sols having a certain degree of aggregate or microgel
formation, corresponding to an S-value from 15 to 40 per
cent, containing silica particles, which may be aluminium
modified or not aluminium modified, and having a specific
surface area within the range from 300 to 700 $m^2/g$, pref-
erably from 400 to 650 $m^2/g$.

The other type of particles which is present in the
suspensions of the invention are hydrated particles of clays
which are expandable in water and which are of the smectite
type. Clays of smectite type are layered silicate minerals and
comprise both naturally occurring materials and synthetic
materials. The materials can be chemically treated, e.g.
alkali treated. The clays should be dispersible in water and
thereby expand so that particles having a large surface area
are obtained. Examples of clays of smectite type which are
expandable in water and which can be used in the present
suspensions are montmorillonite/bentonite, hectorite,
beidelite, nontronite and saponite. Bentonite is preferred and
especially such which is disclosed in the European patent
235893 which after swelling preferably has a surface area of
400 to 800 $m^2/g$.

In the present suspensions the weight ratio of sol par-
ticles to clay particles is within the range 20:1 to 1:10,
calculated on dry material. The weight ratio is suitably
within the range 10:1 to 1:5 and preferably within the range
6:1 to 1:3. The dry content of the suspensions exceeds 5%
by weight and can reach 40% by weight. The dry content
suitably exceeds 8% by weight. The upper limit is suitably
30% by weight and preferably 25% by weight. The suspen-
sions according to the invention are stable which means that they can be prepared with high dry contents and satisfactory viscosity which means that they can be prepared, stored and transported for later use within time periods which are commercially acceptable. As a measure of the stability it can be mentioned that the viscosity of the suspensions three weeks after their preparation should suitably not exceed 1000 cp, measured with Brookfield viscosimeter DV III, spindle 18, at 30 rpm and at 20° C. It is surprising that stable suspensions according to the invention can be prepared with high contents of hydrated clay material of smectite type. Stable suspensions according to the invention can be prepared without use of protective colloids or dispersing agents and it is assumed that the spherical silica particles to a certain extent will function as dispersing agent for the clay material and prevent the thin, flake-like clay particles from agglomerating. The suspensions contain both silica material and clay material and this means that they have a viscosity considerably below the viscosity for a suspension containing only corresponding amount of clay material. The silica material in the present suspensions thus has a double effect, as dispersing agent and as active substance for the flocculation effect at use. It is an advantage that the present suspensions can be prepared without use of additional chemicals for dispersing since such chemicals may have a negative influence on the flocculation effect at the use of the suspensions. Protective colloids and/or dispersing agents can, however, be used if desired, particularly for suspensions of higher dry contents. Such agents can for example be of anionic or nonionic character. As examples of suitable protective colloids can be mentioned water soluble cellulose derivatives such as hydroxyethyl- and hydroxypropyl-, methylhydroxypropyl- and ethyihydroxyethyl-cellulose, methyl- and carboxymethylcellulose, gelatin, starch, guar gum, xanthan gum, polyvinyl alcohol etc.. Optional dispersing agents shall be of anionic and/or nonionic character. Anionic dispersing agents can for example be alkyl- or alkylaryl- sulphates, -sulphonates, -ethersulphates, -phosphates or -etherphosphates, polyacrylic acid and salts of polyacrylic acid etc. Nonionic dispersing agents can for example be ethoxytated fatty alcohols, fatty acids, alkyl phenols or fatty acid amides, ethoxylated or non-ethoxylated glycerol esters, sorbitan esters of fatty acids etc. The suspension may also contain other additives such as preservative agents.

The suspensions according to the invention can for example be prepared by first mixing the clay with water and then adding the silica based sol before the clay has had time to expand in the water followed by careful dispersing. However, it is preferred that the suspensions are prepared by mixing the clay into a sol of silica based particles followed by careful dispersing in this using high shear forces. The dispersing process can for example be carried out using an Ultra-Turrax or other intensive mixer. For the actual dispersing process times are adjusted with regard to the shear forces which are used. The dispersing can be finished in 10 to 15 minutes but using normal equipment an hour or a couple of hours are as a rule required for the dispersing. At the dispersing the clay particles swell. The pH of the suspensions should suitably not be below 2 and not above 11.

The present suspensions are suitable for use as flocculating agents, for example in the production of pulp and paper and within the field of water purification, both for purification of different kinds of waste water and for purification specifically of white water from pulp and paper industry. The suspensions can be used as flocculating agents in combination with cationic or amphoteric polymers which can be natural polymers, i.e. based on carbohydrates, or be synthetic. As examples of suitable polymers can be mentioned cationic and amphoteric starch, cationic and amphoteric guar gum, cationic and amphoteric acrylamide based polymers, cationic polyethyleneimines, polyamidoamines and poly(diallyldimethylammonium chloride). Particularly good results have been obtained when the suspensions have been used in combination with cationic polyacrylamide. Even if arbitrary addition order can be used it is preferred that the polymer is added to pulp, stock or water before the suspension.

The preferred field of use for the suspensions, in combination with polymer, is for improvement of retention and dewatering in the production of paper. The suspensions are hereby suitably added in an amount of from 0.05 to 5 kg per ton, calculated as dry on dry stock system, i.e. fibers and optional fillers, and preferably in an amount of from 0.1 to 3 kg per ton. The dry content of the suspensions at addition to the stock is suitably adjusted to 0.1 to 10 per cent by weight. For synthetic cationic or amphoteric polymers at least 0.01 kg of polymer, calculated as dry, per ton of dry stock system is usually used and suitably amounts of from 0.01 to 3 and preferably from 0.03 to 2 kg per ton are used. For carbohydrate based cationic or amphoteric polymers such as starch and guargum amounts of at least 0.1 kg/ton, calculated as dry on dry stock system, are usually used. For these polymers amounts of from 0.5 to 30 kg/ton are suitably used and preferably from 1 to 15 kg/ton.

The suspensions, in combination: with the polymers, can be used in the production of paper from different kinds of stocks of cellulose containing fibers for example stocks from chemical pulp, such as sulphate- and sulphite pulp, chemothermomechanical pulp (CTMP), thermomechanical pulp, refiner pulp or groundwood pulp from both hardwood and softwood and can also be used for stocks based on recycled fibers. The stocks can of course contain mineral fillers of conventional types such as for example kaolin, titanium dioxide, chalk, talc and both natural and synthetic calcium carbonates. Good results have also been obtained with stocks which are usually considered as difficult. Examples of such stocks are those containing mechanical pulp such as groundwood pulp, stocks based on recycled fibers and stocks which due to the white water system contain high amounts of anionic impurities such as lignin or dissolved organic compounds and/or high contents of electrolytes. Very good results have also been obtained for news furnishes containing recycled fibers and for hydrogen peroxide bleached magazine furnishes. As well known for silica based sols as such an improvement of the retention and dewatering effect can also be obtained for the present suspensions by addition of an aluminium compound to the stock. Any in paper production per se known aluminium compound can be used, for example alum, aluminates, aluminium chloride, aluminium nitrate and polyaluminium compounds, such as polyaluminium chlorides, polyaluminium sulphates and polyaluminium compounds containing both chloride and sulphate ions.

The invention is further illustrated in the following examples which, however, are not intended to limit the same. Parts and per cent relate to parts by weight and per cent by weight respectively, unless otherwise stated.

Example 1

Two suspensions, Suspension 1a) and 1b), having dry contents of about 8.7% were prepared from a silica sol and Na-bentonite. The silica sol (Sol 1) was a 8.5% sol with particles having a specific surface area of about 890 $m^2/g$ and the particles were aluminium modified to a degree of 7%. The S-value of the sol was 30% and the pH value about 9.2.

Suspension 1a) was prepared from 100 g silica sol, 8.93 g of bentonite and 91.07 g of water. The ratio of aluminium modified silica to bentonite in this suspension was thus about 1:1. The suspension 1b) was prepared starting from 133.3 g of silica sol, 5.95 g of bentonite and 60.72 g of water. The ratio silica to bentonite in this suspension was thus about 2:1. The bentonite was added to the silica sol and dispersion was carried out by means of an Ultraturrax at 10000 rpm during 10 minutes. The viscosity of the suspensions was measured with a Brookfield viscosimeter DV-III (spindle no. 18, 30 rpm). The suspensions were then stored at 55° C. for 40 days, which corresponds to storage at room temperature for 400 days. The viscosity was measured after 20 days and 40 days storage.

|  | Viscosity cp | | |
| --- | --- | --- | --- |
|  | Freshly prepared | 20 days | 40 days |
| Suspension 1a | 12.2 | 17.9 | 25.8 |
| Suspension 1b | 8.6 | 12.0 | 14.6 |

As evident the suspensions showed only a very slight viscosity change which indicates a very good stability.

Example 2

In the same manner as in Example 1 a suspension according to the invention was prepared from 125 g of the same silica sol as in Example 1 and 5 g of Na-bentonite. After about 6 hours the bentonite was entirely dispersed in the sol. This suspension (Suspension 2) thus had a ratio aluminium modified silica to bentonite of 2:1 and a dry content of about 12% by weight. The viscosity, measured as in Example 1, was 11.3 cp.

Example 3

In corresponding manner as in Example 1 a suspension was prepared from 7 g of Na-bentonite and 93 g of a 15% silica sol (Sol 2) with particles having a specific surface area of about 500 m$^2$/g and in which 9% of the silicon atoms in the surface groups had been replaced by aluminium atoms. After about 10 hours the bentonite was entirely dispersed in the silica sol. The viscosity for this suspension, measured as above, was 33 cp. As a comparison it can be mentioned that a 6% suspension of only bentonite had a viscosity of about 2900 cp and was thus very difficult to handle. The suspension of this example will in the following be referred to as Suspension 3.

Example 4

A suspension was prepared by mixing a sol having particles with a surface area of 230 m$^2$/g and containing 29% SiO$_2$ and 0.3% Al$_2$O$_3$ with 11.2 g of bentonite which had been mixed with and hydrated in water. The prepared suspension had a dry content of 10% by weight and a ratio of silica to bentonite of 1:2.

Example 5

In this test the retention effect, retention of fibers and fillers in paper production, of the suspensions 1a) and 1b) after 20 days of storage was investigated and a comparison was made with solely silica sol. A standard stock, based on pulp with the composition 60% bleached birch sulphate+ 40% bleached pine sulphate to which 30% of chalk as a filler and 0.3 g/l of Na$_2$SO$_4$·10H$_2$O had been added, was used. The stock had a concentration of 4.9 g/l and a fine fraction content of 0.376 g/l.

The retention properties, in this and following examples, were evaluated by means of a Britt Dynamic Drainage Jar at 800 rpm. This is the conventional test method for retention in the paper industry. The suspensions were used in amounts of 0.8 kg/t in combination with 4 kg/t of a high cationized starch, containing 0.8% nitrogen. The cationic starch was added before the suspension or the silica sol. The amounts that are given in this and following examples are calculated as dry on dry stock system, i.e. fibers and fillers.

The suspension 1a) gave a retention of 60.8% and the suspension 1b) gave a retention of 58.8%. Sol 1 gave a retention of 51.8% when added in an amount of 0.5 kg/t and of 55.6% when added in an amount of 0.6 kg/t.

Example 6

In this example the retention effect of the suspension according to Example 2 was investigated. Comparisons were made with a silica sol of the same kind as present in the suspension (sol 1) and with bentonite. The stock was a standard stock with the composition 60% bleached birch sulphate+40% bleached pine sulphate. 30% of chalk had been added to the pulp as filler and the pulp was then diluted to a concentration of abut 5 g/l. 0.3 g/l of Na$_2$SO$_4$·10H$_2$O were then added. The stock had a fines fraction content of 36.6% and a pH of 8.1. The effect of the suspension, the silica sol and the bentonite was investigated in combination with a conventional low cationized starch having a degree of substitution of 0.042 (sold under the name Raisamyl 142) which in all tests was added in an amount of 8.0 kg/ton of dry stock system (fibers+filler).

The tests gave the following retention results: Suspension 1a in an amount of 1 kg/t: 62.4%. Sol 1 in an amount of 0.5 kg/t: 47.0%. The tests with bentonite were made in amounts of 2, 4 and 6 kg/ton respectively and gave the retention results: 34.3%, 42.0% and 48.1% respectively.

Considerably improved results were thus obtained when the suspension according to the invention were added in an amount corresponding to the sol amount when this was added on its own and this when the amount of bentonite mixed into the suspension could not be expected to give any contribution to improvement of the retention.

Example 7

Using exactly the same stock as in Example 5 an investigation of retention was made also with the suspension according to Example 3 and a comparison was made with solely the sol used in this suspension. The same starch as in Example 6 was used and also here in an amount of 8.0 kg/t.

The tests gave the following retention results:
Suspension 3 in an amount of 2 kg/t: 62.4%.
Suspension 3 in an amount of 3 kg/t: 73.5%.
Sol 2 in an amount of 1 kg/t; 48.7%.
Sol 2 in an amount of 2 kg/t: 69.1%.

Also for this suspension considerably improved results were thus obtained when this was added to give the same sol amount as when the sol was used by itself and this when the amount of bentonite mixed into the suspension could not be expected to give any contribution to improvement of the retention.

Example 8

Retention tests were made with a standard stock (based on pulp of 60% bleached birch sulphate+40% bleached pine sulphate with addition of 30% of chalk and 0.3 g/l of Na$_2$SO$_4$·10H$_2$O). The stock concentration was about 5 g/l, the fine fraction content was 37.4% and the pH 8.1. In these tests the suspension 2, sol 1 and bentonite were used in combination with a cationic polyacrylamide, Floerger Fo 4190 PG, with 10 mole per cent of cationic charges and a molecular weight of about 10 millions. The cationic polyacrylamide was used in an amount of 1.0 kg/t.

The obtained retention results were as follows:

| Susp. 2 kg/t | Sol 1 kg/t | Retention % |
| --- | --- | --- |
| 0.1 | | 48.9 |
| 0.2 | | 58.6 |
| 0.3 | | 74.2 |
| 0.4 | | 80.0 |
| 0.5 | | 85.0 |
| | 0.1 | 44.6 |
| | 0.2 | 53.7 |
| | 0.3 | 68.8 |
| | 0.4 | 72.6 |
| | 0.5 | 76.9 |

Solely bentonite added in an amount of 0.5 kg/t gave a retention of 72.0%.

Thus considerably improved results were obtained also for combinations with cationic polyacrylamide when the suspension was added in an amount corresponding to the same sol amount as when this was used on its own and this when the amount of bentonite mixed into the suspension was such that no contribution to improvement of retention could be expected of this.

Example 9

In this example retention tests were made with the suspension according to Example 4. Comparisons were made with a silica sol of the same kind as in the suspension and with bentonite. In all tests 0.5 kg/t of the same cationic polyacrylamide as utilized earlier was used. The retention tests were made with a standard pulp of the same kind as earlier. The stock had a concentration of about 5 g/l and a fine fraction content of 38.3%.

The retention results were as follows:
Suspension 4 added in an amount of 1.5 kg/t: 69.0%.
Sol 4 added in an amount of 1.0 kg/t: 32.8%.
Bentonite added in amounts of 2, 4 and 6 kg/t respectively:
51.4%, 53.5% and 54.0% respectively.

The sol used in this example had an extremely low surface area and has in itself no positive effect on retention. However, with suspensions containing this sol and bentonite a marked improvement of retention was obtained and this could not have been expected with regard to the amount of bentonite.

Example 10

In this example a series of suspensions were prepared with varying contents of silica particles and Na-bentonite (White bentonite). The suspensions were prepared by dispersing in a Waring-mixer using maximum rpm during 15 minutes. The silica sols that were used were: sol A=sol with particles having a specific surface area of about 890 m²/g, aluminium modified to a degree of 5%, the S-value for sol A was 30% and the pH was about 8.8; sol B=sol with particles having a specific surface area of 500 m²/g and the particles were aluminium modified to a degree of 9% and the sol was alkali stabilized to a molar ratio $SiO_2:Na_2O$ of about 40:1; sol C=sol corresponding to sol B with the exception that the particles were not aluminium modified; sol D=sol with particles having a specific surface area of 220 m²/g and an aluminium modification of 5% and the sol was alkali stabilized to a molar ratio $SiO_2:Na_2O$ of about 90:1; sol E=sol corresponding to sol D with the exception that the particles were not aluminium modified and that the molar ratio $SiO_2:Na_2O$ was about 100:1.

For the prepared suspensions the viscosity was measured with a Brookfield viscosimeter RVT, spindle 4, 50 rpm at 20° C., 10 days after their preparation. The samples were shaken slightly before measuring.

In table 1 below the composition of the suspensions and the measured viscosities are shown. The ratio Si:B stands for the ratio silica:bentonite in the suspensions, calculated as dry material.

TABLE 1

| | Sol type | Dry content % | Ratio Si:B | Visc. cp |
| --- | --- | --- | --- | --- |
| Susp. a | A | 9.6 | 10:1 | 10 |
| Susp. b | A | 10.4 | 5:1 | 16 |
| Susp. c | A | 12.7 | 2:1 | 60 |
| Susp. d | A | 12.7 | 1:1 | 200 |
| Susp. e | A | 12.7 | 1:2 | 750 |
| Susp. f | A | 10.0 | 1:5 | 600 |
| Susp. g | B | 21.0 | 2:1 | 360 |
| Susp. h | C | 21.0 | 2:1 | 130 |
| Susp. i | D | 25.0 | 2:1 | 630 |
| Susp. j | E | 25.0 | 2:1 | 620 |
| Susp. k | E | 34.8 | 5:1 | 240 |

As a comparison can be mentioned that while the viscosity of suspension d, which contained 6.3% of bentonite was 200 cp a suspension of solely bentonite with a concentration of 6.3% had a viscosity of about 3000 already 30 minutes after its preparation and was thus classified as a gel.

For certain suspensions the dewatering effect was also investigated by means of a "Canadian Standard Freeness Tester" which is the conventional method for characterization of dewatering or drainage capability according to SCAN-C 21:65. All additions of chemicals were made at a mixing speed of 1000 rpm. The stock was a standard stock from 60/40 bleached hardwood sulphate pulp and bleached pinewood sulphate pulp respectively with addition of 30% precipitated calcium carbonate and a concentration of 3 g/l. The dewatering effect for the suspensions was investigated in combination with addition of both cationic starch and cationic polyacrylamide which were added to the stock before the suspensions. The starch, of the same type as in Example 6, was added in an amount of 10 kg/t and the cationic polyacrylamide, of the same type as in Example 8, in an amount of 0.5 kg/t. Additionally 0.5 kg/t of alum were added to the stock first of all. The suspensions were in all cases added in amounts corresponding to an amount of 0.5 kg/t of silica particles.

TABLE 2

| Suspension | Bentonite amount kg/t added through the susp. | CSF ml |
| --- | --- | --- |
| a | 0.05 | 520 |
| b | 0.1 | 525 |
| c | 0.25 | 540 |
| d | 0.5 | 560 |
| e | 1.0 | 575 |
| f | 2.5 | 580 |

As a comparison can be mentioned that solely sol added in an amount of 0.5 kg silica particles per ton gave a CSF value of 500 and solely bentonite added in an amount of 1 kg/t gave a CSF value of 380. The CSF value of the stock with addition of solely the polymers and alum was 355.

We claim:

1. An aqueous stable suspension of colloidal particles which comprises silica based anionic particles and hydrated particles of clays of smectite type which are expandable in water whereby the weight ratio of silica based particles to clay particles is within the range of from 20:1 to 1:10 and the dry content of the suspension is within the range of from 5 to 40 percent by weight.

2. The suspension of claim 1 wherein the weight ratio of silica based particles to clay particles is within the range of from 6:1 to 1:3.

3. The suspension of claim 1 wherein the dry content of the suspension is within the range of from 8 to 30 percent by weight.

4. The suspension of claim 1 wherein the silica based particles originate from a silica based sol having an S-value within the range of from 8 to 45% and having silica particles with a specific surface area within the range from 750 to 1000 m$^2$/g, the particles being aluminum modified to a degree of from 2 to 25%.

5. The suspension of claim 1 wherein the clay particles are bentonite particles.

6. The suspension of claim 5, wherein the bentonite is sodium bentonite.

7. A water purification process which comprises utilizing the aqueous suspension of claim 1 as a flocculating agent.

8. The suspension of claim 1, wherein the silica base particles are selected from the group consisting of colloidal silica, colloidal aluminum modified silica, aluminum silicate and polysilicic acid.

9. The suspension of claim 8, wherein the polysilicic acid has a specific surface area of from 1000 to 1700 m$^2$/g.

10. The suspension of claim 1, wherein the colloidal silica based particles have a specific surface area of from 50 to 1000 m$^2$/g.

11. The suspension of claim 1, wherein the silica based particles are aluminum-modified.

12. A process for the preparation of an aqueous suspension of colloidal particles which comprises mixing a clay of smectite type which is expandable in water into a sol of silica based particles in order to form a suspension wherein the weight ratio of silica based particles to clay particles is within the range of from 20:1 to 1:10 and wherein the dry content of the suspension is within the range of from 5 to 40 percent by weight.

13. A process for the production of pulp and paper which comprises utilizing an aqueous suspension of colloidal particles as a flocculating agent wherein said suspension comprises both silica based particles and particles of clay of smectite type which are expandable in water whereby the weight ratio of silica based particles to clay particles in the suspension is within the range of from 20:1 to 1:10 and the dry content of the suspension is within the range from 5 to 40 percent by weight.

14. The process of claim 13, whereby the suspensions are used as flocculating agent for improvement of retention and dewatering in paper making.

15. The process of claim 13 whereby the suspensions are used in combination with cationic starch cationic acrylamide based polymer or mixtures thereof.

16. The process of claim 15, whereby the suspensions are used in combination with cationic acrylamide based polymer.

17. The process of claim 13 wherein said suspension is employed in combination with cationic and amphoteric polymers.

18. The process of claim 13, wherein the suspension is added to papermaking stock in an amount of from 0.05 to 5 kg/ton, calculated as dry on dry stock system.

* * * * *